US012323262B2

(12) United States Patent
Lai et al.

(10) Patent No.: US 12,323,262 B2
(45) Date of Patent: Jun. 3, 2025

(54) SYSTEMS AND METHODS FOR COREFERENCE RESOLUTION

(71) Applicant: ADOBE INC., San Jose, CA (US)

(72) Inventors: Tuan Manh Lai, Urbana, IL (US);
Trung Huu Bui, San Jose, CA (US);
Doo Soon Kim, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/806,751

(22) Filed: Jun. 14, 2022

(65) Prior Publication Data
US 2023/0403175 A1    Dec. 14, 2023

(51) Int. Cl.
*H04L 12/18* (2006.01)
*G06F 40/284* (2020.01)
*G06N 3/04* (2023.01)

(52) U.S. Cl.
CPC ........ *H04L 12/1831* (2013.01); *G06F 40/284* (2020.01); *G06N 3/04* (2013.01)

(58) Field of Classification Search
None
See application file for complete search history.

(56) References Cited

U.S. PATENT DOCUMENTS

| | | | | |
|---|---|---|---|---|
| 11,366,966 | B1 * | 6/2022 | Ramsey | G06F 40/295 |
| 2015/0127340 | A1 * | 5/2015 | Epshteyn | G10L 21/00 |
| | | | | 704/235 |
| 2021/0034701 | A1 * | 2/2021 | Fei | G06N 3/044 |
| 2021/0142785 | A1 * | 5/2021 | Wang | G10L 13/047 |
| 2022/0261555 | A1 * | 8/2022 | Lebanoff | G06F 40/166 |
| 2022/0414130 | A1 * | 12/2022 | Master Ben-Dor | G06F 16/683 |

OTHER PUBLICATIONS

1Ng, "Supervised Noun Phrase Coreference Research: The First Fifteen Years", Association for Computational Linguistics, Proceedings of the 48th Annual Meeting of the Association for Computational Linguistics, Jul. 2010, pp. 1396-1411, 16 pages.

(Continued)

*Primary Examiner* — William G Trost, IV
*Assistant Examiner* — Christopher P Cadorna
(74) *Attorney, Agent, or Firm* — F. CHAU & ASSOCIATES, LLC

(57) ABSTRACT

Systems and methods for coreference resolution are provided. One aspect of the systems and methods includes inserting a speaker tag into a transcript, wherein the speaker tag indicates that a name in the transcript corresponds to a speaker of a portion of the transcript; encoding a plurality of candidate spans from the transcript based at least in part on the speaker tag to obtain a plurality of span vectors; extracting a plurality of entity mentions from the transcript based on the plurality of span vectors, wherein each of the plurality of entity mentions corresponds to one of the plurality of candidate spans; and generating coreference information for the transcript based on the plurality of entity mentions, wherein the coreference information indicates that a pair of candidate spans of the plurality of candidate spans corresponds to a pair of entity mentions that refer to a same entity.

17 Claims, 12 Drawing Sheets

(56) References Cited

OTHER PUBLICATIONS

2Raghunathan, et al., "A Multi-Pass Sieve for Coreference Resolution", Association for Computational Linguistics, Proceedings of the 2010 Conference on Empirical Methods in Natural Language Processing, Oct. 2010, pp. 492-501, 10 pages.

3Durrett, et al., "Easy Victories and Uphill Battles in Coreference Resolution", Association for Computational Linguistics, Proceedings of the 2013 Conference on Empirical Methods in Natural Language Processing, Oct. 2013, pp. 1971-1982, 12 pages.

4Clark, et al., "Entity-Centric Coreference Resolution with Model Stacking", Association for Computational Linguistics, Proceedings of the 53rd Annual Meeting of the Association for Computational Linguistics and the 7th International Joint Conference on Natural Language Processing (vol. 1: Long Papers), Jul. 2015, pp. 1405-1415, 11 pages.

5Wiseman, et al., "Learning Global Features for Coreference Resolution", arXiv preprint arXiv:1604.03035v1 [cs.CL] Apr. 11, 2016, 11 pages.

6Clark, et al., "Deep Reinforcement Learning for Mention-Ranking Coreference Models", arXiv preprint arXiv:1609.08667v3 [cs.CL] Oct. 31, 2016, 7 pages.

7Lee, et al., "End-to-end Neural Coreference Resolution", arXiv preprint arXiv:1707.07045v2 [cs.CL] Dec. 15, 2017, 10 pages.

8Zhang, et al., "Neural Coreference Resolution with Deep Biaffine Attention by Joint Mention Detection and Mention Clustering", arXiv preprint arXiv:1805.04893v1 [cs.CL] May 13, 2018, 6 pages.

9Lee, et al., "Higher-order Coreference Resolution with Coarse-to-fine Inference", arXiv:1804.05392v1 [cs.CL] Apr. 15, 2018, 6 pages.

10Gu, et al, "A Study on Improving End-to-End Neural Coreference Resolution", in Sun, et al. (eds), Chinese Computational Linguistics and Natural Language Processing Based on Naturally Annotated Big Data, CCL NLP-NABD 2018, Lecture Notes in Computer Science, vol. 11221, pp. 159-169, Springer, Cham., Oct. 7, 2018, 11 pages.

11Fei, et al., "End-to-end Deep Reinforcement Learning Based Coreference Resolution", in Proceedings of the 57th Annual Meeting of the Association for Computational Linguistics, Jul. 2019, pp. 660-665, 6 pages.

12Kantor, et al., "Coreference Resolution with Entity Equalization", in Proceedings of the 57th Annual Meeting of the Association for Computational Linguistics, Jul. 2019, pp. 673-677, 5 pages.

13Joshi, et al., "BERT for Coreference Resolution: Baselines and Analysis", arXiv preprint arXiv:1908.09091v4 [cs.CL] Dec. 22, 2019, 6 pages.

14Fang, et al., "Incorporating Structural Information for Better Coreference Resolution", in Proceedings of the 28th International Joint Conference on Artificial Intelligence (IJCAI-19), Aug. 10-16, 2019, pp. 5039-5045, 7 pages.

15Joshi, et al., "SpanBERT: Improving Pre-training by Representing and Predicting Spans", in Transactions of the Association for Computational Linguistics, 2020, vol. 8, pp. 64-77, Jan. 1, 2020, 14 pages.

16Xu, et al., "Revealing the Myth of Higher-Order Inference in Coreference Resolution", arXiv preprint arXiv:2009.12013v2 [cs.CL] Sep. 28, 2020, 7 pages.

17Kirstain, et al., "Coreference Resolution without Span Representations", arXiv preprint arXiv:2101.00434v2 [cs.CL] May 31, 2021, 6 pages.

18Wu, et al., "CorefQA: Coreference Resolution as Query-based Span Prediction", arXiv preprint arXiv:1911.01746v4 [cs.CL] Jul. 18, 2020, 12 pages.

19Devlin, et al., "BERT: Pre-training of Deep Bidirectional Transformers for Language Understanding", arXiv preprint arXiv:1810.04805v2 [cs.CL] May 24, 2019, 16 pages.

20Turian, et al., "Word representations: A simple and general method for semi-supervised learning", in Proceedings of the 48th Annual Meeting of the Association for Computational Linguistics, Jul. 2010, pp. 384-394, 11 pages.

21Pennington, et al., "GloVe: Global Vectors for Word Representation", in Proceedings of the 2014 Conference on Empirical Methods in Natural Language Processing (EMNLP), Oct. 25-29, 2014, pp. 1532-1543, 12 pages.

22Bahdanau, et al., "Neural Machine Translation by Jointly Learning to Align and Translate", arXiv preprint arXiv:1409.0473v7 [cs.CL] May 19, 2016, 15 pages.

23Pradhan, et al., "CoNLL-2012 Shared Task: Modeling Multilingual Unrestricted Coreference in OntoNotes", in Proceedings of the Joint Conference on EMNLP and CoNLL: Shared Task, Jul. 13, 2012, pp. 1-40, 40 pages.

24Sanh, et al., "DistilBERT, a distilled version of BERT: smaller, faster, cheaper and lighter", arXiv preprint arXiv:1910.01108v4 [cs.CL] Mar. 1, 2020, 5 pages.

25Sun, et al., "MobileBERT: a Compact Task-Agnostic BERT for Resource-Limited Devices", arXiv preprint arXiv:2004.02984v2 [cs.CL] Apr. 14, 2020, 13 pages.

26Lai, et al., "A Simple but Effective BERT Model for Dialog State Tracking on Resource-Limited Systems", arXiv preprint arXiv:1910.12995v3 [cs.CL] Feb. 9, 2020, 5 pages.

27Lai, et al., "A Context-Dependent Gated Module for Incorporating Symbolic Semantics into Event Coreference Resolution", arXiv preprint arXiv:2104.01697v1 [cs.CL] Apr. 4, 2021, 9 pages.

28Wen, et al., "RESIN: A Dockerized Schema-Guided Cross-document Cross-lingual Cross-media Information Extraction and Event Tracking System", in Proceedings of the 2021 Conference of the North American Chapter of the Association for Computational Linguistics: Human Language Technologies: Demonstrations, Jun. 2021, pp. 133-143, 11 pages.

* cited by examiner 500　　　　　　　　　505

Barack Obama nominated Hilary Rodham Clinton as his secretary of state on Monday. He chose her because she had foreign affairs experience.

FIG. 5

SYSTEMS AND METHODS FOR COREFERENCE RESOLUTION

BACKGROUND

The following relates to the natural language processing (NLP) task of coreference resolution. NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

Coreference resolution is an NLP technique in which at least some text in a document is resolved into clusters based on coreference to a same entity. However, conventional coreference resolution techniques may use complicated or computationally expensive architecture. There is therefore a need in the art for systems and methods that provide a simplified coreference resolution process.

SUMMARY

Embodiments of the present disclosure provide coreference resolution systems and methods that preprocess a transcript by inserting speaker tags into a transcript and generate coreference information for the transcript based on the speaker tags using a machine learning model. In some embodiments, the coreference information includes clusters of entity mentions, where the entity mentions are clustered according to references to a same entity. By preprocessing the transcript to include speaker tags and generating the coreference information based on the speaker tags, rather than generating binary values based on comparing speaker information with speaker utterances, embodiments of the present disclosure provide coreference resolution systems and methods that are simpler and less computationally expensive than conventional coreference resolution techniques, but are still able to obtain accurate transcript coreference clusters.

A method, apparatus, non-transitory computer readable medium, and system for coreference resolution are described. One or more aspects of the method, apparatus, non-transitory computer readable medium, and system include inserting a speaker tag into a transcript, wherein the speaker tag indicates that a name in the transcript corresponds to a speaker of a portion of the transcript; encoding a plurality of candidate spans from the transcript based at least in part on the speaker tag to obtain a plurality of span vectors; extracting a plurality of entity mentions from the transcript based on the plurality of span vectors, wherein each of the plurality of entity mentions corresponds to one of the plurality of candidate spans; and generating coreference information for the transcript based on the plurality of entity mentions, wherein the coreference information indicates that a pair of candidate spans of the plurality of candidate spans corresponds to a pair of entity mentions that refer to a same entity.

A method, apparatus, non-transitory computer readable medium, and system for coreference resolution are described. One or more aspects of the method, apparatus, non-transitory computer readable medium, and system include identifying training data comprising training text, mention annotation data, and coreference annotation data; encoding a plurality of candidate spans from the training text to obtain a plurality of span vectors; extracting a plurality of entity mentions from the training text based on the plurality of span vectors using a mention extractor network, wherein each of the plurality of entity mentions corresponds to one of the plurality of candidate spans; updating parameters of the mention extractor network in a first training phase based on the plurality of entity mentions and the mention annotation data; extracting an updated plurality of entity mentions from the training text based on the plurality of span vectors using the mention extractor network with the updated parameters; generating coreference information based on the updated plurality of entity mentions using a mention linker network, wherein the coreference information indicates that a pair of candidate spans of the plurality of candidate spans corresponds to a pair of entity mentions that refer to a same entity; and updating the mention linker network in a second training phase based on the coreference information and the coreference annotation data.

An apparatus and system for coreference resolution are described. One or more aspects of the apparatus and system include an encoder network configured to encode a plurality of candidate spans from a text to obtain a plurality of span vector; a mention extractor network configured to extract a plurality of entity mentions from the text based on the plurality of span vectors, wherein the mention extractor network is trained based on mention annotation data in a first training phase and based on coreference annotation data in a second training phase; and a mention linker network configured to generate coreference information for the text based on the plurality of entity mentions, wherein the coreference information indicates that a pair of candidate spans of the plurality of candidate spans corresponds to a pair of entity mentions that refer to a same entity, and wherein the mention linker network is trained on the coreference annotation data in the second training phase.

BRIEF DESCRIPTION OF THE DRAWINGS

FIG. 5 shows an example of coreference clustering according to aspects of the present disclosure.

DETAILED DESCRIPTION

Figure 1:
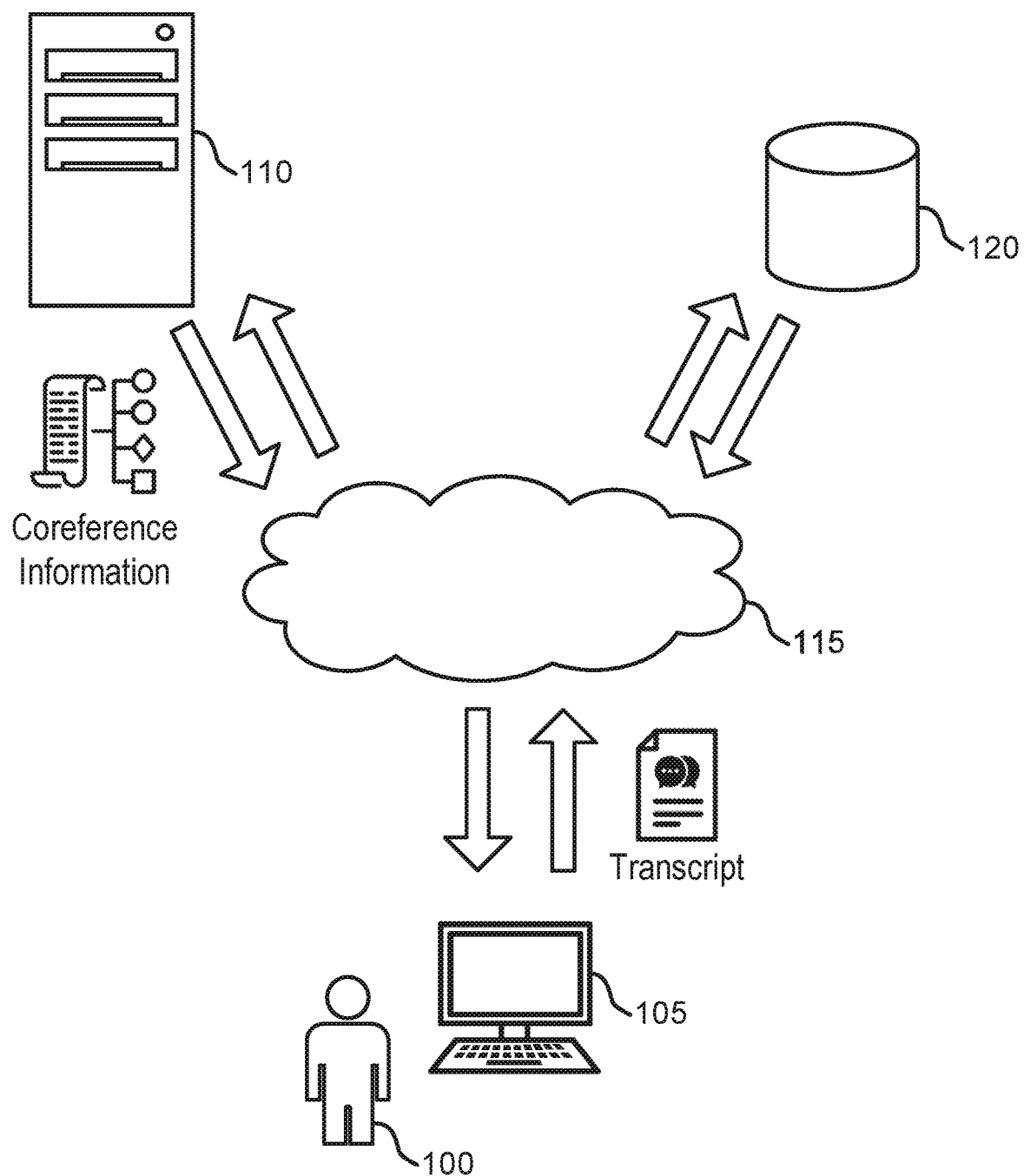
FIG. 1 shows an example of a coreference resolution system according to aspects of the present disclosure.

The present disclosure relates to the natural language processing (NLP) task of coreference resolution. NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

Coreference resolution is an NLP technique in which at least some text in a document is resolved into clusters based on coreference to a same entity. However, conventional coreference resolution techniques may use complicated or computationally expensive architecture, such as bidirectional LSTMs (long short term memories) and convolutional neural networks.

Systems and methods described in the present disclosure apply machine learning to resolve accurate coreference clusters (e.g., groups or chains of text that refer to a same entity) based on a transcript that is preprocessed to include speaker tags. In an example embodiment, a preprocessing component inserts a speaker tag into a transcript. In some embodiments, the speaker tag indicates that a name in the transcript corresponds to a speaker of a portion of the transcript. An encoder network then encodes a plurality of candidate spans from the transcript based at least in part on the speaker tag to obtain a plurality of span vectors. A mention extractor network extracts a plurality of entity mentions from the transcript based on the plurality of span vectors.

In some embodiments, each of the plurality of entity mentions corresponds to one of the plurality of candidate spans. Finally, a mention liner network generates coreference information for the transcript based on the plurality of entity mentions. In some embodiments, the coreference information indicates that a pair of candidate spans of the plurality of candidate spans corresponds to a pair of entity mentions that refer to a same entity.

By preprocessing the transcript to include speaker tags and generating the coreference information based on the speaker tags, embodiments of the present disclosure provide coreference resolution systems and methods that are simpler and less computationally expensive than conventional coreference resolution techniques, but are still able to obtain accurate coreference clusters.

Embodiments of the present disclosure may be used in a transcript coreference summarizing context. For example, a user provides a transcript to the system, the system generates coreference information and a summary including the coreference information, and provides the summary to the user. An example application of the present disclosure in the transcript coreference summarizing context is provided with reference to FIG. 4. Details regarding the architecture of the system are provided with reference to FIGS. 1-3. Examples of a process for coreference resolution is provided with reference to FIGS. 4-9. Examples of a process for training the machine learning model is provided with reference to FIGS. 10-12.

Coreference Resolution System

A system and apparatus for coreference resolution is described with reference to FIGS. 1-3. One or more aspects of the system and apparatus include an encoder network configured to encode a plurality of candidate spans from a text to obtain a plurality of span vector; a mention extractor network configured to extract a plurality of entity mentions from the text based on the plurality of span vectors, wherein the mention extractor network is trained based on mention annotation data in a first training phase and based on coreference annotation data in a second training phase; and a mention linker network configured to generate coreference information for the text based on the plurality of entity mentions, wherein the coreference information indicates that a pair of candidate spans of the plurality of candidate spans corresponds to a pair of entity mentions that refer to a same entity, and wherein the mention linker network is trained based on the coreference annotation data in the second training phase.

In some aspects, the encoder network comprises a transformer network. In some aspects, the mention extractor network comprises a feed-forward neural network. In some aspects, the mention linker network comprises a feed-forward neural network.

Some examples of the system and apparatus further include a preprocessing component configured to insert a speaker tag into a transcript, wherein the text comprises the transcript and the speaker tag. Some examples of the system and apparatus further include a training component configured to update parameters of the mention extractor network and the mention linker network.

FIG. 1 shows an example of a coreference resolution system according to aspects of the present disclosure. The example shown includes user 100, user device 105, coreference resolution apparatus 110, cloud 115, and database 120.

Referring to FIG. 1, user 100 provides a transcript to coreference resolution apparatus 110 via user device 105, and coreference resolution apparatus 110 generates coreference resolution information in response to receiving the transcript. In some embodiments, the coreference resolution information includes information indicating a coreference cluster (a set of entity mentions that refer to a same entity) in the transcript. In some embodiments, coreference resolution apparatus 110 provides the coreference information to user 100 via user device 105.

According to some aspects, user device 105 is a personal computer, laptop computer, mainframe computer, palmtop computer, personal assistant, mobile device, or any other suitable processing apparatus. In some examples, user device 105 includes software that displays a graphical user interface provided by coreference resolution apparatus 110. In some aspects, the graphical user interface allows user 100 to upload or otherwise transfer a file including the transcript to coreference resolution apparatus 110. In some aspects, the graphical user interface displays the coreference information and/or a summary including the coreference information to user 100.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

According to some aspects, coreference resolution apparatus 110 includes a computer implemented network. In some embodiments, the computer implemented network includes a machine learning model. In some embodiments, coreference resolution apparatus 110 also includes one or more processors, a memory subsystem, a communication interface, an I/O interface, one or more user interface components, and a bus. Additionally, in some embodiments, coreference resolution apparatus 110 communicates with user device 105 and database 120 via cloud 115.

In some cases, coreference resolution apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general purpose computing device, a personal computer, a laptop computer, a mainframe computer, a supercomputer, or any other suitable processing apparatus. Coreference resolution apparatus 110 is an example of, or includes aspects of, the corresponding element described with reference to FIG. 2.

Figure 2:
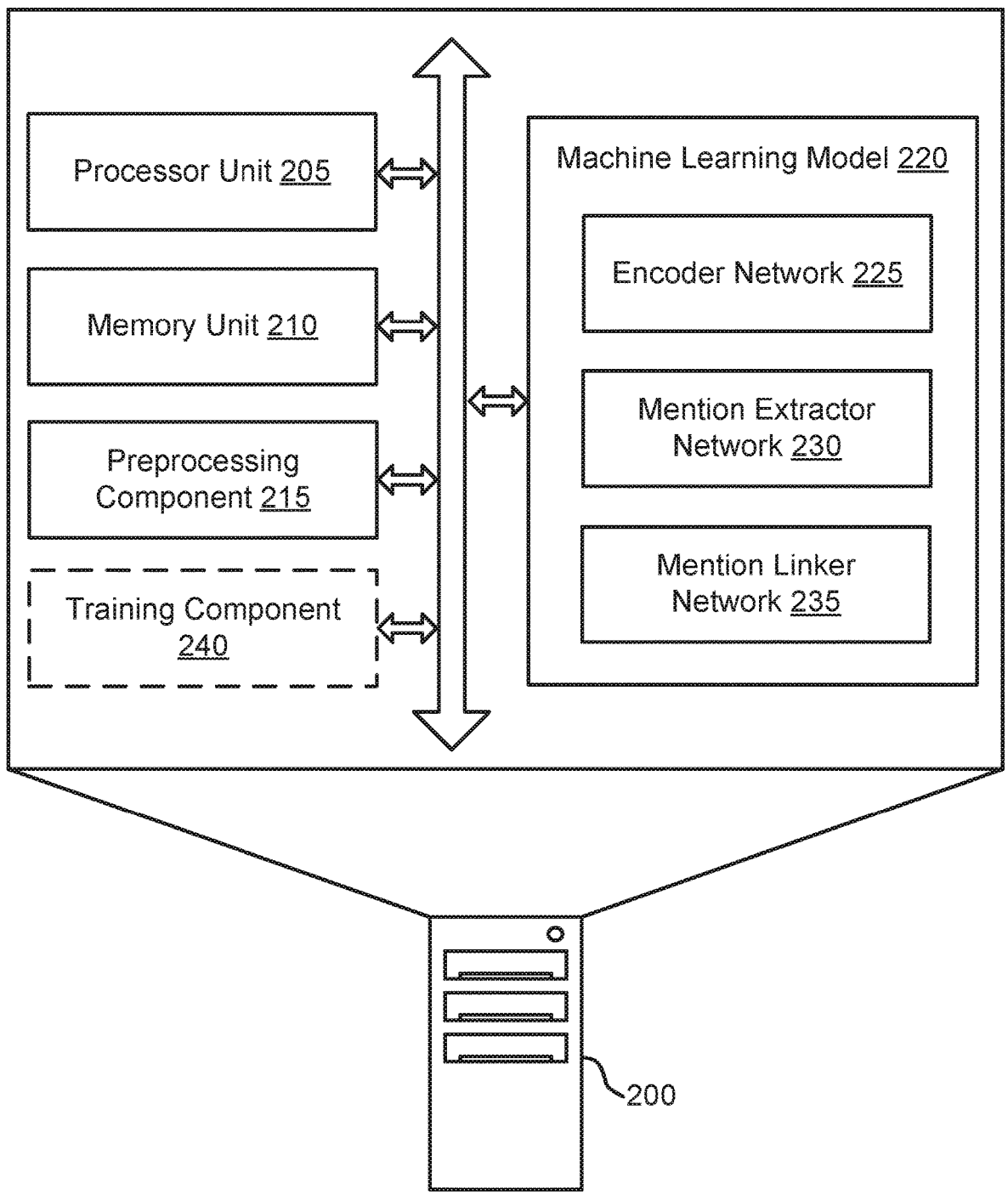
FIG. 2 shows an example of a coreference resolution apparatus according to aspects of the present disclosure.
Figure 3:
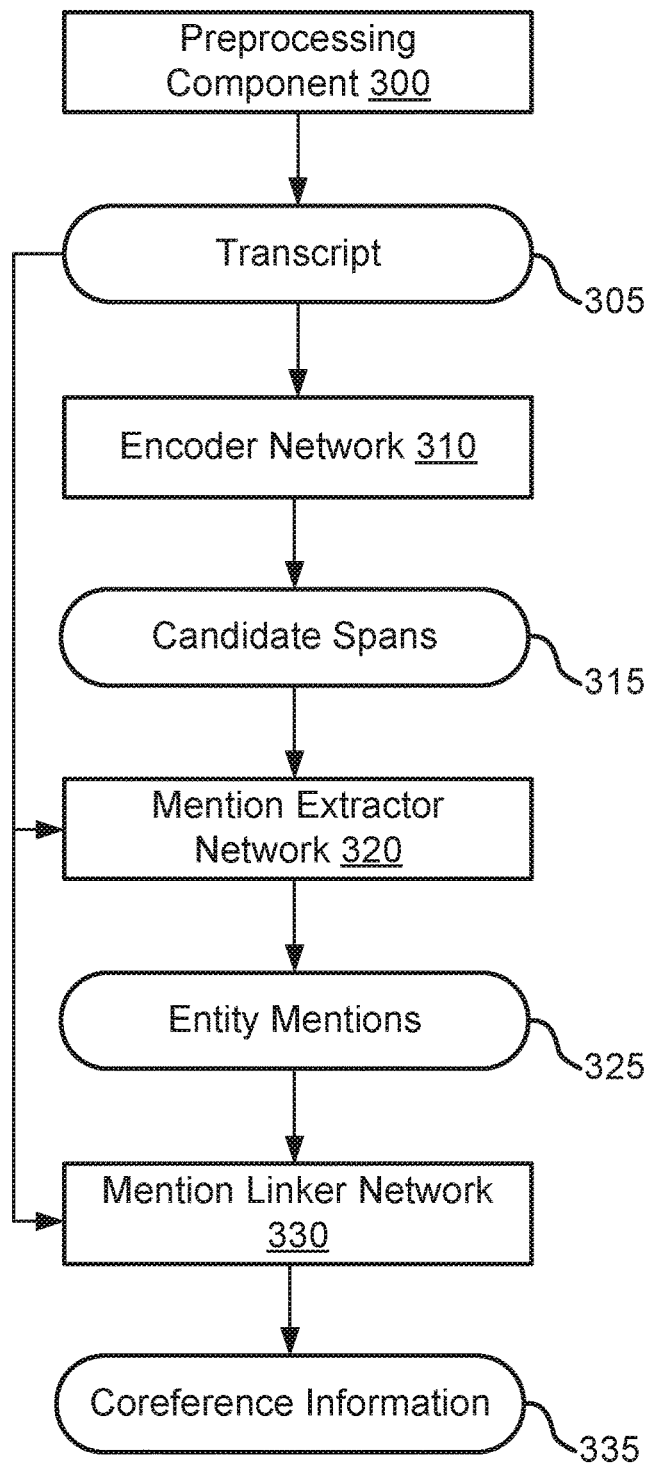
FIG. 3 shows an example of data flow in a coreference resolution apparatus according to aspects of the present disclosure.

Further detail regarding the architecture of coreference resolution apparatus 110 is provided with reference to FIGS. 2-3. Further detail regarding a process for coreference resolution is provided with reference to FIGS. 4-9. Further detail regarding a process for training the machine learning model is provided with reference to FIGS. 10-12. Coreference resolution apparatus 110 is an example of, or includes aspects of, the corresponding element described with reference to FIG. 2.

Cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, coreference resolution apparatus 110, and database 120.

Database 120 is an organized collection of data. In an example, database 120 stores data in a specified format known as a schema. According to some aspects, database 120 is structured as a single database, a distributed database, multiple distributed databases, or an emergency backup database. In some cases, a database controller manages data storage and processing in database 120. In some cases, user 100 interacts with the database controller. In other cases, the database controller operates automatically without user interaction. According to some aspects, database 120 stores the various outputs generated by components of coreference resolution apparatus 110, including coreference information. In some aspects, coreference resolution apparatus 110 retrieves the transcript from database 120. In some aspects, coreference resolution apparatus 110 retrieves training text from database 120. In some aspects, database 120 is external to coreference resolution apparatus 110 and communicates with coreference resolution apparatus 110 via cloud 115. In some embodiments, database 120 is included in coreference resolution apparatus 110.

FIG. 2 shows an example of a coreference resolution apparatus 200 according to aspects of the present disclosure. Coreference resolution apparatus 200 is an example of, or includes aspects of, the corresponding element described with reference to FIG. 1. In one aspect, coreference resolution apparatus 200 includes processor unit 205, memory unit 210, preprocessing component 215, machine learning model 220, and training component 240.

Processor unit 205 includes one or more processors. A processor is an intelligent hardware device such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk. Examples of memory devices include solid state memory and a hard disk drive. In some examples, memory unit 210 is used to store computer-readable, computer-executable software including instructions that, when executed, cause a processor of processor unit 205 to perform various functions described herein. In some cases, memory unit 210 contains, among other things, a basic input/output system (BIOS) which controls basic hardware or software operation such as the interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, preprocessing component 215 inserts a speaker tag into a transcript, where the speaker tag indicates that a name in the transcript corresponds to a speaker of a portion of the transcript. In some examples, preprocessing component 215 inserts an opening tag before the name. In some examples, preprocessing component 215 inserts a closing tag after the name, where the speaker tag includes the opening tag and the closing tag. According to some aspects, preprocessing component 215 inserts a speaker tag in the training text, where the speaker tag indicates that a name in the training text corresponds to a speaker of a portion of the training text.

According to some aspects, preprocessing component 215 is configured to insert a speaker tag into a transcript, wherein the text comprises the transcript and the speaker tag. According to some aspects, preprocessing component 215 is implemented as one or more hardware circuits, as firmware, as software, or as a combination thereof. Preprocessing component 215 is an example of, or includes aspects of, the corresponding element described with reference to FIG. 3.

According to some aspects, machine learning model 220 includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, machine learning model 220 is implemented as one or more hardware circuits, as firmware, as software, or as a combination thereof. In one aspect, machine learning model 220 includes encoder network 225, mention extractor network 230, and mention linker network 235. According to some aspects, each of encoder network 225, mention extractor network 230, and mention linker network 235 includes one or more ANNs.

According to some aspects, encoder network 225 encodes a set of candidate spans from the transcript based on the speaker tag to obtain a set of span vectors. In some examples, encoder network 225 identifies a threshold span length. In some examples, encoder network 225 selects each span in the transcript that is less than the threshold span length to obtain the set of candidate spans. According to some aspects, encoder network 225 encodes a set of candidate spans from the training text to obtain a set of span vectors.

In some examples, encoder network 225 encodes individual tokens of the transcript including the speaker tag to obtain a set of encoded tokens. In some examples, encoder network 225 identifies a starting token and an end token for each of the set of candidate spans, where a span vector corresponding to each of the set of candidate spans includes the starting token and the end token. In some examples, encoder network 225 generates an attention vector based on a subset of the encoded tokens corresponding to each of the set of candidate spans, where the span vector includes the attention vector.

According to some aspects, encoder network 225 is configured to encode a plurality of candidate spans from a text to obtain a plurality of span vector. According to some aspects, encoder network 225 is implemented as one or more hardware circuits, as firmware, as software, or as a combination thereof. Encoder network 225 is an example of, or includes aspects of, the corresponding element described with reference to FIG. 3.

In some aspects, encoder network 225 includes a transformer network. A transformer or transformer network is a type of neural network model that may be used for natural language processing tasks. A transformer network transforms one sequence into another sequence using an encoder and a decoder. Each of the encoder and decoder may include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word.

In some examples, a transformer network includes an attention mechanism, where the attention looks at an input sequence and decides at each step which other parts of the sequence are important. In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values.

In some embodiments, the transformer network is implemented according to BERT model. BERT is a transformer-based model that is used for natural language processing and for processing other forms of ordered data. In some examples, BERT is used as a language representation model, and is configured to pretrain deep bidirectional representations from unlabeled text by jointly conditioning on both left and right context in all layers. As a result, the pre-trained BERT model can be fine-tuned with an additional output layer to create network models for tasks such as question answering and language inference. In some embodiments, the transformer network is implemented as a SpanBERT model.

In some embodiments, the coreference resolution apparatus provides a graphical user interface via a user device to update or change parameters of the transformer network, for example, using a Transformers library. According to some aspects, the transformer network is implemented as one or more hardware circuits, as firmware, as software, or as a combination thereof.

Conventional coreference resolution techniques may use GloVe or Turian embeddings, or may use character embeddings produced by one-dimensional convolutional neural networks. In contrast, a transformer network is relatively straightforward, simplified, and computationally inexpensive. Accordingly, by using a transformer network, some embodiments of the present disclosure provide a coreference resolution method that is easier to implement than conventional coreference resolution techniques but that achieves comparable or better results.

According to some aspects, mention extractor network 230 extracts a set of entity mentions from the transcript based on the set of span vectors, where each of the set of entity mentions corresponds to one of the set of candidate spans. In some examples, mention extractor network 230 generates a mention score for each of the set of candidate spans based on a corresponding span vector from the set of span vectors. In some examples, mention extractor network 230 identifies a mention score threshold. In some examples, mention extractor network 230 determines that each of the set of entity mentions has a mention score that exceeds the mention score threshold, where the set of entity mentions are extracted based on the determination.

In some examples, mention extractor network 230 identifies the pair of candidate spans from the set of candidate spans. In some examples, mention extractor network 230 combines a pair of span vectors of the set of span vectors corresponding to the pair of candidate spans to obtain a span pair vector. In some examples, mention extractor network 230 computes a product of the pair of span vectors, where the span pair vector includes the pair of span vectors and the product of the pair of span vectors.

According to some aspects, mention extractor network 230 extracts a set of entity mentions from the training text based on the set of span vectors using a mention extractor network 230, where each of the set of entity mentions corresponds to one of the set of candidate spans. In some examples, mention extractor network 230 extracts an updated set of entity mentions from the training text based on the set of span vectors using the mention extractor network 230 with the updated parameters. In some examples, mention extractor network 230 generates a mention score for each of the set of candidate spans based on a corresponding span vector from the set of span vectors using the mention extractor network 230.

According to some aspects, mention extractor network 230 is configured to extract a plurality of entity mentions from the text based on the plurality of span vectors, wherein mention extractor network 230 is trained by training component 240 based on mention annotation data in a first training phase and based on coreference annotation data in a second training phase. According to some aspects, mention extractor network 230 is implemented as one or more hardware circuits, as firmware, as software, or as a combination thereof. Mention extractor network 230 is an example of, or includes aspects of, the corresponding element described with reference to FIG. 3.

In some aspects, mention extractor network 230 includes a feed-forward neural network. A feed-forward neural network is an ANN in which connections between nodes do not form a cycle. By using a feed-forward neural network, some embodiments of the present disclosure provide a relatively simple and computationally inexpensive machine learning model for coreference resolution. According to some aspects, the feed-forward neural network is implemented as one or more hardware circuits, as firmware, as software, or as a combination thereof.

According to some aspects, mention linker network 235 generates coreference information for the transcript based on the set of entity mentions, where the coreference information indicates that a pair of candidate spans of the set of candidate spans corresponds to a pair of entity mentions that refer to a same entity.

In some examples, coreference resolution apparatus 200 applies mention linker network 235 to the span pair vector to obtain a similarity score for the pair of candidate spans, where the coreference information is based on the similarity score. In some examples, mention linker network 235 combines the similarity score with mention scores for each of the pair of candidate spans to obtain a coreference score, where the coreference information includes the coreference score.

According to some aspects, mention linker network 235 generates coreference information based on the updated set of entity mentions, where the coreference information indicates that a pair of candidate spans of the set of candidate spans corresponds to a pair of entity mentions that refer to a same entity.

In some examples, mention linker network 235 identifies an antecedent for an entity mention of the set of entity mentions based on the coreference annotation data. In some examples, mention linker network 235 identifies a probability of the antecedent for the entity mention based on the coreference information.

According to some aspects, mention linker network 235 is configured to generate coreference information for the text based on the plurality of entity mentions, wherein the coreference information indicates that a pair of candidate spans of the plurality of candidate spans corresponds to a pair of entity mentions that refer to a same entity, and wherein the mention linker network is trained by training component 240 on the coreference annotation data in the second training phase. According to some aspects, mention linker network 235 is implemented as one or more hardware circuits, as firmware, as software, or as a combination thereof.

In some aspects, mention linker network 235 includes a feed-forward neural network. In some aspects, the feed-forward neural network of mention linker network 235 is similar to the feed-forward neural network of mention extractor network 230. According to some aspects, the feed-forward neural network is implemented as one or more hardware circuits, as firmware, as software, or as a combination thereof.

According to some aspects, training component 240 identifies training data including training text, mention annotation data, and coreference annotation data. In some examples, training component 240 updates parameters of the mention extractor network 230 in a first training phase based on the set of entity mentions and the mention annotation data. In some examples, training component 240 updates the mention linker network in a second training phase based on the coreference information and the coreference annotation data. In some examples, training component 240 updates the parameters of the mention extractor network 230 in the second training phase based on the coreference information and the coreference annotation data.

In some examples, training component 240 computes a detection score for each of the set of candidate spans based on the mention score and a binary value indicating whether the candidate span is included in the mention annotation data. In some examples, training component 240 computes a detection loss based on the detection score and updates the parameters of the mention extractor network 230 based on the detection loss in the first training phase. In some examples, training component 240 computes an objective function based on the probability and updates the parameters of the mention linker network to optimize the objective function.

According to some aspects, training component 240 is configured to update parameters of the mention extractor network 230 and the mention linker network. According to some aspects, training component 240 is implemented as one or more hardware circuits, as firmware, as software, or as a combination thereof. According to some aspects, training component 240 is omitted from coreference resolution apparatus 200 and is included in an external device. In these cases, the external device communicates with coreference resolution apparatus 200 to train machine learning model 220 via training component 240.

FIG. 3 shows an example of data flow in a coreference resolution apparatus according to aspects of the present disclosure. The example shown includes preprocessing component 300, transcript 305, encoder network 310, candidate spans 315, mention extractor network 320, entity mentions 325, mention linker network 330, and coreference information 335.

Referring to FIG. 3, preprocessing component 300 outputs transcript 305. In some embodiments, transcript 305 is a tokenized transcript. Encoder network 310 receives transcript 305 from preprocessing component 300 and identifies candidate spans 315 in response. Mention extractor network 320 receives transcript 305 from preprocessing component 300 and candidate spans 315 from encoder network 310 and extracts entity mentions 325 from transcript 305 based on candidate spans 315 in response. Mention linker network 330 receives transcript 305 from preprocessing component 300 and entity mentions 325 from mention extractor network 320 and generates coreference information 335 in response.

Preprocessing component 300 is an example of, or includes aspects of, the corresponding element described with reference to FIG. 2. Transcript 305 is an example of, or includes aspects of, the corresponding element described with reference to FIG. 7. Encoder network 310 is an example of, or includes aspects of, the corresponding element described with reference to FIG. 2. Mention extractor network 320 is an example of, or includes aspects of, the corresponding element described with reference to FIG. 2.

Coreference Resolution

A method for coreference resolution is described with reference to FIGS. 4-9. One or more aspects of the method include inserting a speaker tag into a transcript, wherein the speaker tag indicates that a name in the transcript corresponds to a speaker of a portion of the transcript; encoding a plurality of candidate spans from the transcript based at least in part on the speaker tag to obtain a plurality of span vectors; extracting a plurality of entity mentions from the transcript based on the plurality of span vectors, wherein each of the plurality of entity mentions corresponds to one of the plurality of candidate spans; and generating coreference information for the transcript based on the plurality of entity mentions, wherein the coreference information indicates that a pair of candidate spans of the plurality of candidate spans corresponds to a pair of entity mentions that refer to a same entity.

Some examples of the method further include inserting an opening tag before the name. Some examples further include inserting a closing tag after the name, wherein the speaker tag includes the opening tag and the closing tag. Some examples of the method further include identifying a threshold span length. Some examples further include selecting each span in the transcript that is less than the threshold span length to obtain the plurality of candidate spans.

Some examples of the method further include encoding individual tokens of the transcript including the speaker tag to obtain a plurality of encoded tokens. Some examples further include identifying a starting token and an end token for each of the plurality of candidate spans, wherein a span vector corresponding to each of the plurality of candidate spans includes the starting token and the end token. Some examples of the method further include generating an attention vector based on a subset of the encoded tokens corresponding to each of the plurality of candidate spans, wherein the span vector includes the attention vector.

Some examples of the method further include generating a mention score for each of the plurality of candidate spans based on a corresponding span vector from the plurality of span vectors. Some examples further include identifying a mention score threshold. Some examples further include determining that each of the plurality of entity mentions has a mention score that exceeds the mention score threshold, wherein the plurality of entity mentions are extracted based on the determination.

Some examples of the method further include identifying the pair of candidate spans from the plurality of candidate spans. Some examples further include combining a pair of span vectors of the plurality of span vectors corresponding to the pair of candidate spans to obtain a span pair vector. Some examples further include applying a mention linker network to the span pair vector to obtain a similarity score for the pair of candidate spans, wherein the coreference information is based on the similarity score.

Some examples of the method further include combining the similarity score with mention scores for each of the pair of candidate spans to obtain a coreference score, wherein the coreference information includes the coreference score. Some examples of the method further include computing a product of the pair of span vectors, wherein the span pair vector includes the pair of span vectors and the product of the pair of span vectors.

Figure 4:
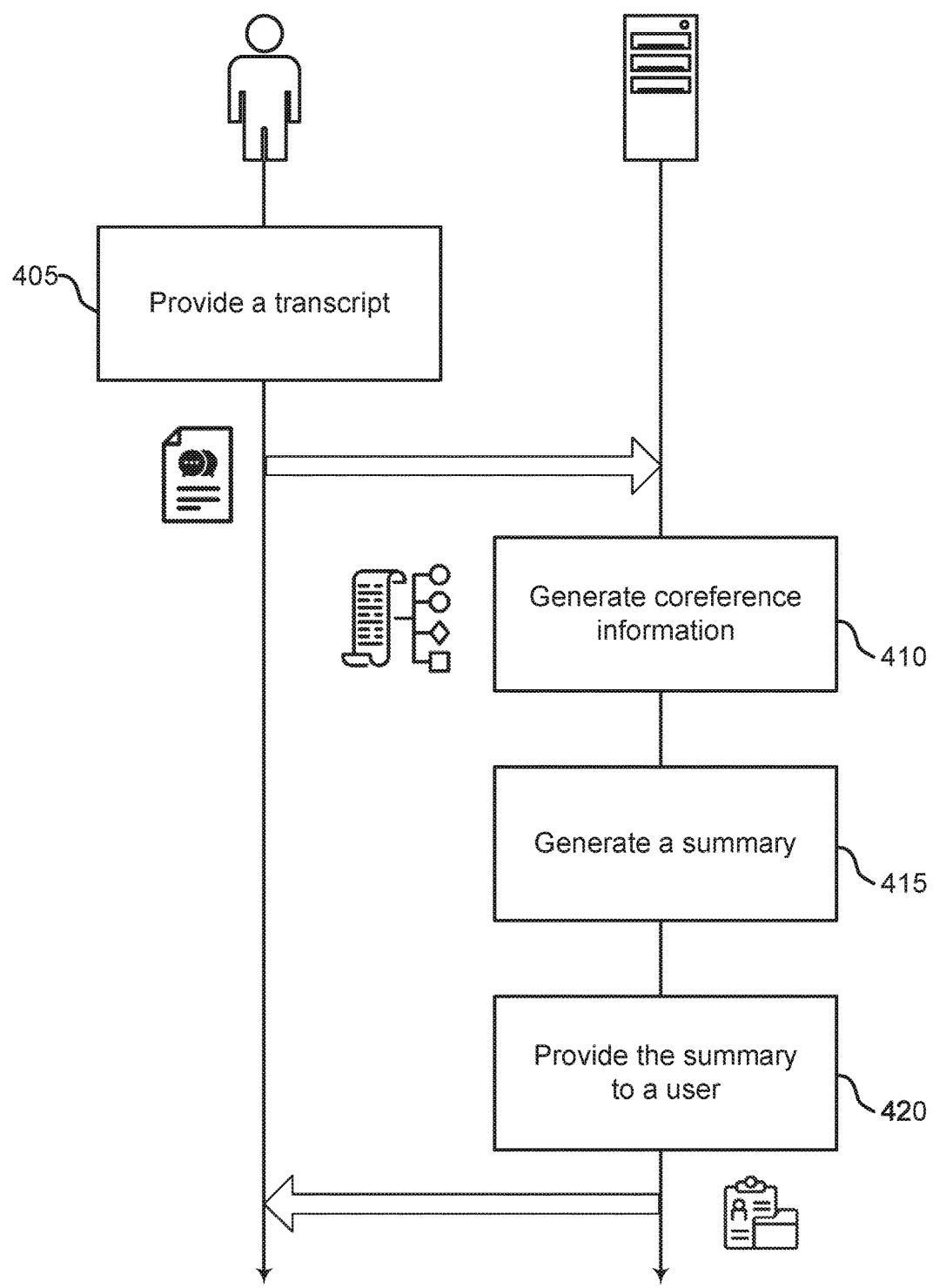
FIG. 4 shows an example of coreference resolution according to aspects of the present disclosure.

FIG. 4 shows an example of coreference resolution according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, at least one embodiment of the present disclosure is used in a transcript coreference summarization context. In an example, a user provides a transcript to a coreference resolution apparatus as described with reference to FIGS. 1 and 2 for creating a summary of coreference information. In some embodiments, a transcript is a document including text and speaker information corresponding to speaker utterances. In some cases, the transcript includes entity mentions, e.g., text that refers to a particular entity. In some embodiments, the coreference information is a visual depiction of clusters of entity mentions that refer to a same entity. An example of coreference clusters is described with reference to FIG. 5. In some embodiments, the summary includes the coreference information, or includes a list of the clusters of entity mentions. In some embodiments, the summary includes addition annotation information, such as location information for the coreference information in the transcript.

At operation 405, a user described with reference to FIG. 1 provides a transcript to the system. In some embodiments, the user uploads the transcript to a coreference resolution apparatus of the system via a user device as described with reference to FIG. 1. In some embodiments, the coreference resolution apparatus provides a graphical user interface via the user device for the user to upload or otherwise transfer the transcript.

At operation 410, the system generates coreference information. In some cases, the operations of this step refer to, or may be performed by, the coreference resolution apparatus as described with reference to FIGS. 1 and 2. For example, the system generates coreference information using a machine learning model as described with reference to FIGS. 6, 8, and 9.

At operation 415, the system generates a summary. In some cases, the operations of this step refer to, or may be performed by, the coreference resolution apparatus as described with reference to FIGS. 1 and 2. In some embodiments, the summary includes the coreference information. In some embodiments, the summary includes similarity scores corresponding to the coreference information. In some embodiments, the summary includes annotations that refer to positions of entity mentions corresponding to the coreference information within the transcript (such as line number, paragraph number, page number, etc.).

At operation 420, the system provides the summary to a user. In some cases, the operations of this step refer to, or may be performed by, the coreference resolution apparatus as described with reference to FIGS. 1 and 2. In some embodiments, the coreference resolution apparatus displays the summary and/or the coreference information via a graphical user interface displayed by the user device. In some embodiments, the coreference resolution apparatus uploads or otherwise transfers a computer file including the summary and/or the coreference information to the user via the user device.

FIG. 5 shows an example of coreference clustering according to aspects of the present disclosure. The example shown includes first coreference cluster 500 and second coreference cluster 505.

Referring to FIG. 5, an example transcript includes the sentences "Barack Obama nominated Hilary Rodham Clinton as his secretary of state on Monday. He chose her because she had foreign affairs experience." In some embodiments, a coreference resolution apparatus as described with reference to FIGS. 1 and 2 tokenizes the sentences and obtains coreference resolution information for the tokenized sentences based on a similarity score associated with entity mentions as described with reference to FIGS. 6, 8, and 9. In some embodiments, entity mentions are groups of tokens that refer to an entity.

In some embodiments, the coreference resolution apparatus resolves entity mentions of the transcript into coreference clusters based on similarity scores determined by comparing pairs of entity mentions. In the example illustrated by FIG. 5, first coreference cluster 500 includes the entity mentions "Barack Obama", "his", and "he", where each of the entity mentions is determined to refer to a same first entity, and second coreference cluster 505 includes the entity mentions "Hilary Rodham Clinton", "her", and "she", where each of the entity mentions is determined to refer to a same second entity.

FIG. 5 illustrates coreference information according to some embodiments in which coreference clusters are visually depicted in relation to the transcript (here, as text that is outlined by solid and dashed rectangles). In some embodiments, the coreference information is further included in a summary. In some embodiments, the summary includes the coreference clusters corresponding to the coreference information as well as the remaining text included in the transcript. In some embodiments, the coreference information includes the coreference clusters and omits the remaining text included in the transcript. In some embodiments, the summary includes location information for the coreference clusters (such as line number, paragraph number, page number, etc.) in the transcript.

Figure 6:
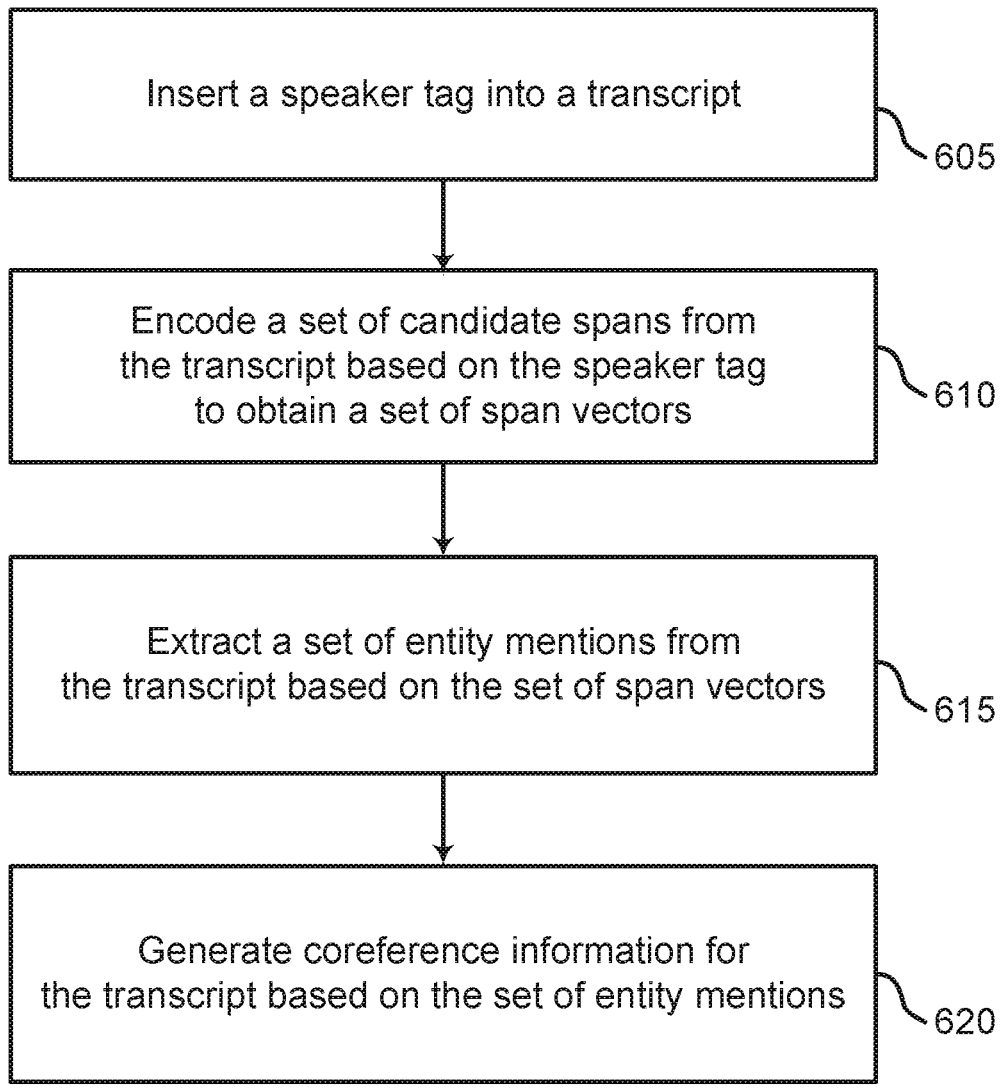
FIG. 6 shows an example of generating coreference information according to aspects of the present disclosure.

FIG. 6 shows an example of generating coreference information according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, a preprocessing component of a coreference resolution apparatus as described with reference to FIGS. 1 and 2 inserts speaker tags into a transcript and provides the transcript to a machine learning model of the coreference resolution apparatus. The machine learning model encodes candidate spans (e.g., sets of adjacent tokens) from the transcript based on the speaker tag to obtain a set of span vectors, extracts a set of entity mentions (e.g., candidate spans that are determined to refer to an entity) from the transcript based on the set of span vectors, and generates coreference information for the transcript based on the set of entity mentions. In some embodiments, the coreference information includes a cluster of entity mentions that are determined to refer to a same entity. In some embodiments, by inserting the speaker tag into the transcript and encoding the set of candidate spans based on the speaker tag, the machine learning model incorporates speaker information into the coreference information in a more straightforward and simplified manner than conventional coreference resolution techniques, which may instead convert speaker information into binary features indicating whether two candidate utterances correspond to a same speaker.

At operation 605, the system inserts a speaker tag into a transcript, where the speaker tag indicates that a name in the transcript corresponds to a speaker of a portion of the transcript. In some cases, the operations of this step refer to, or may be performed by, a preprocessing component as described with reference to FIGS. 2 and 3.

In some embodiments, the preprocessing component receives the transcript from a user device. The transcript includes text, including speaker information corresponding to utterances. In an example, the speaker information includes a speaker name. In an example, the preprocessing component inserts an opening tag before the speaker name in the transcript, and inserts a closing tag after the speaker name in the transcript, where the speaker tag includes the opening tag and the closing tag. In some embodiments, the preprocessing component directly concatenates the speaker tag, the name, and the corresponding utterance in the transcript. An example of inserting a speaker tag into a transcript is described with reference to FIG. 7.

In some embodiments, the preprocessing component tokenizes the transcript. Tokenization refers to splitting text into smaller units called tokens that represent either words or word segments ("sub-words"). In some embodiments, the processing component tokenizes the transcript using a tokenizing algorithm. In some embodiments, the tokenizing algorithm is WordPiece. In other embodiments, other tokenizing algorithms are used.

At operation 610, the system encodes a set of candidate spans from the transcript based on the speaker tag to obtain a set of span vectors. In some cases, the operations of this step refer to, or may be performed by, an encoder network as described with reference to FIGS. 2 and 3.

In an example, the encoder network identifies a threshold span length and selects each span in the transcript that is less than the threshold span length to obtain the set of candidate spans. As used herein, a span includes one or more adjacent tokens. For example, given an input transcript D= $(t_1, t_2, \ldots, t_n)$ including n tokens, the total number of possible text spans is N=n(n+1)/2. For each span i, start and end indices of the span are denoted by START(i) and END(i), respectively. The encoder network assumes an ordering of the spans in the transcript based on START(i), such that spans with a same start index are ordered by END(i). In some embodiments, the encoder network only considers a span if it is included in its entirety in a single sentence of the transcript. In at least one embodiment, the threshold span length is measured in terms of a number of tokens. In at least one embodiment, the threshold span length is a predetermined threshold span length, and the encoder network identifies the threshold span length in response to being provided with the predetermined threshold span length.

In an example, the encoder network encodes individual tokens of the transcript including the speaker tag to obtain a plurality of encoded tokens, and identifies a starting token and an end token for each of the plurality of candidate spans. In some embodiments, the encoder network includes a transformer network, and the transformer network forms a contextualized representation $x_1, x_2, \ldots, x_n$ of each individual token $t_1, t_2, \ldots, t_n$. A span vector of the plurality of span vectors corresponding to each of the plurality of candidate spans includes the starting token and the end token.

According to some aspects, the encoder network generates an attention vector based on a subset of the encoded tokens corresponding to each of the plurality of candidate spans, wherein the span vector includes the attention vector. For example, for each span i, the encoder network obtains a corresponding span vector $g_i[x_{START(i)}, x_{END(i)}, \hat{x}_i]$, where $x_{START(i)}$ and $x_{END(i)}$ are boundary representations including representations of the start and end index tokens START(i) and END(i), and the attention vector $\hat{x}_i$ is a weighted sum of token vectors in the span i. In some embodiments, the encoder network computes $\hat{x}_i$ according to equations 1-3:

$$\alpha_t = FFNN_\alpha(x_t) \quad (1)$$

$$\beta_{i,t} = \frac{\exp(\alpha_t)}{\sum_{j=START(i)}^{END(i)} \exp(\alpha_j)} \quad (2)$$

$$\hat{x}_i = \sum_{j=START(i)}^{END(i)} \beta_{i,t} x_j \quad (3)$$

where $FFNN_\alpha$ is a multi-layer feed-forward neural network that maps each token-level representation $x_t$ into an unnormalized attention score.

Conventional coreference resolution techniques may use GloVe or Turian embeddings, or may use character embeddings produced by one-dimensional convolutional neural networks. In contrast, a transformer network is relatively straightforward, simplified, and computationally inexpensive. Accordingly, by using a transformer network, some embodiments of the present disclosure provide a coreference resolution method that is easier to implement than conventional coreference resolution techniques but that achieves comparable or better results.

Furthermore, conventional coreference resolution techniques may include additional features in a span vector $g_i$, such as the size of the span i. In contrast, in some embodiments of the present disclosure, the span vector $g_i$ does not include additional features, thereby simplifying the machine learning model.

As used herein, a first span vector of the pair of span vectors is denoted $g_i$, and a second span vector of the pair of span vectors is denoted $g_j$, where i and j are the respective corresponding spans.

At operation 615, the system extracts a set of entity mentions from the transcript based on the set of span vectors, where each of the set of entity mentions corresponds to one of the set of candidate spans. In some cases, the operations of this step refer to, or may be performed by, a mention extractor network as described with reference to FIGS. 2 and 3. As used herein, the term "entity mention" refers to a span in the transcript that represents an utterance corresponding to a particular entity. For example, given the sentence "Barack Obama nominated Hilary Rodham Clinton as his secretary of state on Monday," a first span including tokenized representations of the words "Barack Obama" and a second span including a tokenized representation of the word "his" are each entity mentions corresponding to an entity named "Barack Obama", and a third span including a tokenized representation of the words "Hilary Rodham Clinton" is an entity mention corresponding to an entity named "Hilary Rodham Clinton." In example, the mention extractor network extracts the set of entity mentions from the transcript as described with reference to FIG. 8.

At operation 620, the system generates coreference information for the transcript based on the set of entity mentions, where the coreference information indicates that a pair of candidate spans of the set of candidate spans corresponds to a pair of entity mentions that refer to a same entity. In some cases, the operations of this step refer to, or may be performed by, a mention linker network as described with reference to FIGS. 2 and 3. In an example, the mention linker network generates the coreference information for the transcript as described with reference to FIG. 9.

Figure 7:
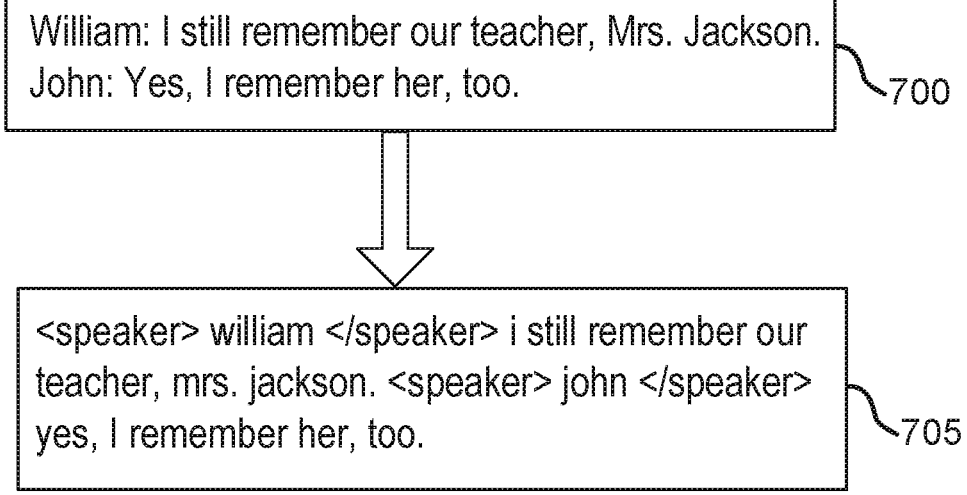
FIG. 7 shows an example of transcript preprocessing according to aspects of the present disclosure.

FIG. 7 shows an example of transcript preprocessing according to aspects of the present disclosure. The example shown includes input transcript 700 and output transcript 705.

Referring to FIG. 7, a preprocessing component described with reference to FIGS. 2 and 3 receives input transcript 700. In some embodiments, input transcript 700 includes speaker information corresponding to speaker utterances. For example, the speaker information of input transcript 700 includes speaker names William and John that respectively correspond to utterances via a colon included in the input document adjacent to the speaker names. In some embodiments, the preprocessing component inserts speaker tags next to the speaker names in input transcript 700 to obtain output transcript 705. In an example, the preprocessing component removes colons that are adjacent to speaker names in input transcript 700 to obtain output transcript 705.

Output transcript 705 is an example of, or includes aspects of, the transcript described with reference to FIG. 3.

Figure 8:
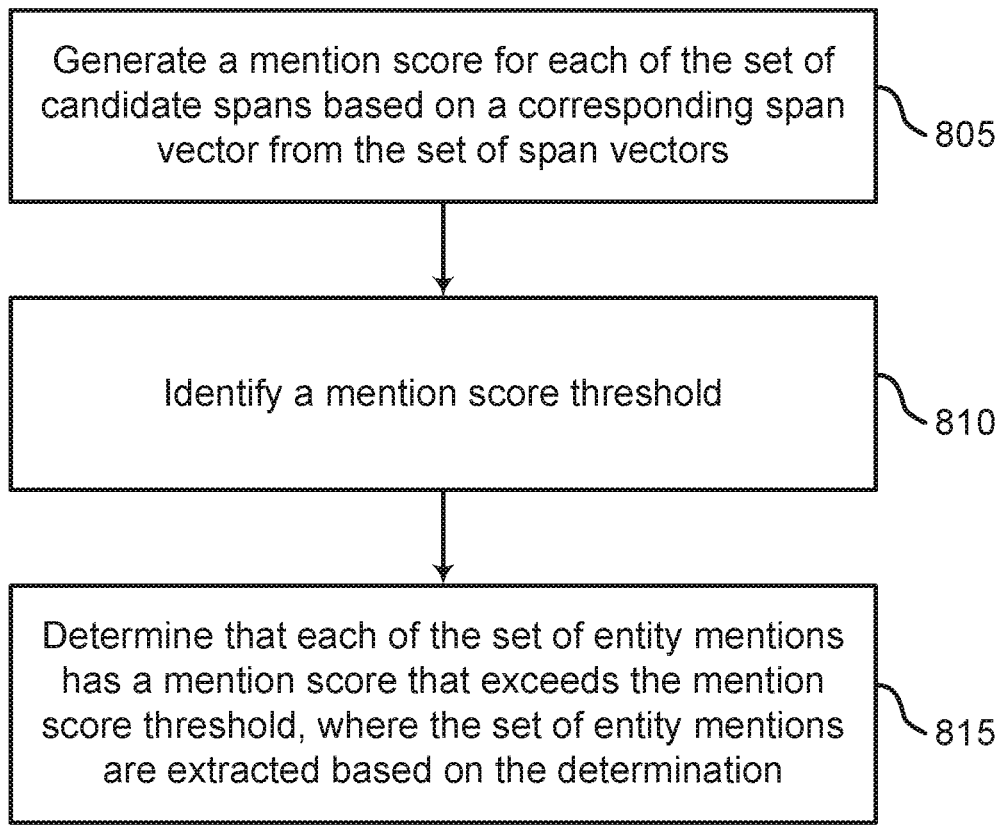
FIG. 8 shows an example of extracting a plurality of entity mentions according to aspects of the present disclosure.

FIG. 8 shows an example of extracting a plurality of entity mentions according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system generates a mention score for each of the set of candidate spans based on a corresponding span vector from the set of span vectors. In some cases, the operations of this step refer to, or may be performed by, a mention extractor network as described with reference to FIGS. 2 and 3. In some embodiments, the mention extractor network includes a feed-forward network neural network $FFNN_m$, and the feed-forward network neural network $FFNN_m$ computes the mention score $s_m(i)$:

$$s_m(i)=FFNN_m(g_i) \quad (4)$$

In some embodiments, a mention score is a numerical representation, having a value equal to or greater than 0 and less than or equal to 1, of a degree to which the mention extractor network thinks the span vector $g_i$ is a representation of a span i that is an entity mention.

At operation 810, the system identifies a mention score threshold. In some cases, the operations of this step refer to, or may be performed by, a mention extractor network as described with reference to FIGS. 2 and 3. In some embodiments, the mention score threshold λn is a predetermined threshold with a value greater than 0 and less than or equal to 1.

At operation 815, the system determines that each of the set of entity mentions has a mention score that exceeds the mention score threshold, where the set of entity mentions are extracted based on the determination. In some cases, the operations of this step refer to, or may be performed by, a mention extractor network as described with reference to FIGS. 2 and 3. For example, the mention extractor network determines that a mention score $s_m(i)$ exceeds the mention score threshold λn. The mention extractor network then identifies the span vector $g_i$ and the span i including the entity mention corresponding to the mention score $s_m(i)$, and extracts the entity mention associated with the mention score $s_m(i)$ from the transcript. As used herein, extracting an entity mention refers to associating a span i (including an entity mention) that corresponds to a mention score $s_m(i)$ that exceeds the mention score threshold λn with the mention score $s_m(i)$ and the corresponding span vector $g_i$ in a data schema. In some embodiments, the data schema is included in a database, such as the database described with reference to FIG. 1.

Figure 9:
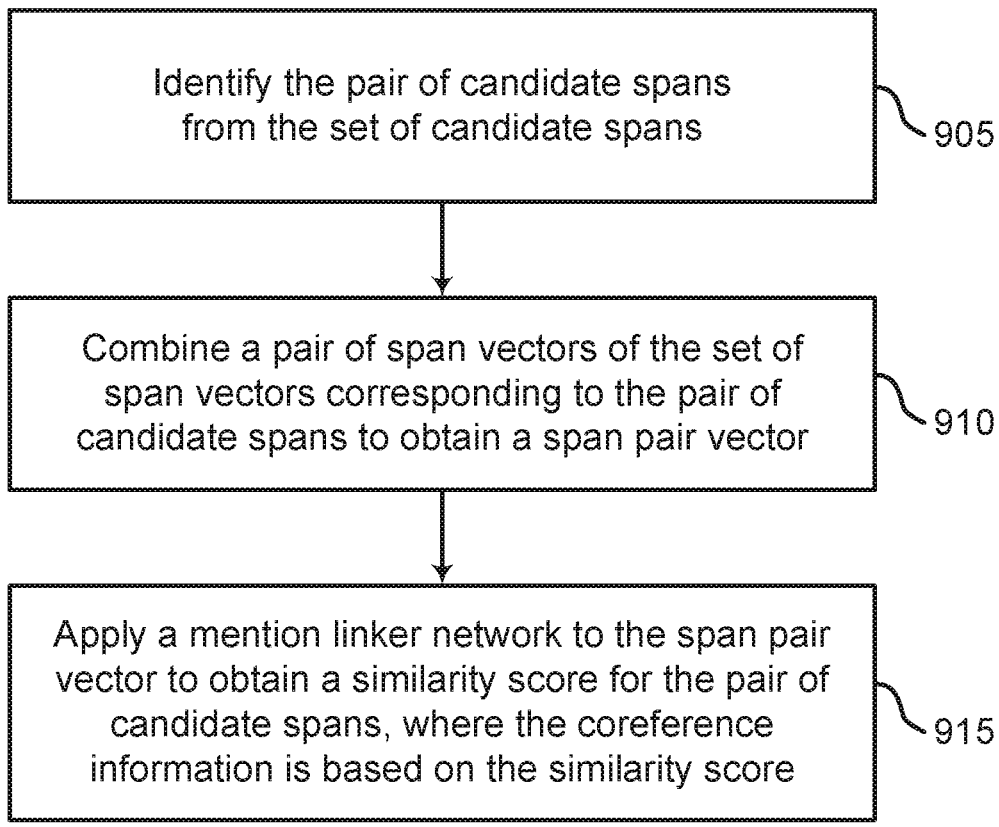
FIG. 9 shows an example of obtaining a similarity score according to aspects of the present disclosure.

FIG. 9 shows an example of obtaining a similarity score according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system identifies the pair of candidate spans from the set of candidate spans. In some cases, the operations of this step refer to, or may be performed by, a mention extractor network as described with reference to FIGS. 2 and 3.

For example, the mention extractor network identifies a candidate span i and a candidate span j that are each respectively associated with an entity mention that has been extracted from the transcript as described with reference to FIGS. 6 and 8. In some embodiments, for each entity mention extracted by the mention extractor, the mention linker assigns an antecedent span $a_i$ corresponding to an antecedent entity mention that refers to a same entity as the entity mention, or assigns a dummy antecedent $\epsilon = a_i \in Y(i) = \{\epsilon, 1, \ldots, i-1\}$. In some embodiments, the dummy antecedent is assigned when the entity mention does not have an antecedent span $a_1$.

At operation 910, the system combines a pair of span vectors of the set of span vectors corresponding to the pair of candidate spans to obtain a span pair vector. In some cases, the operations of this step refer to, or may be performed by, a mention extractor network as described with reference to FIGS. 2 and 3. For example, the mention extractor network computes span pair vector $s_a(i,j)$:

$$s_a(i,j)=FFNN_a([g_i, g_j, g_i \circ g_j]) \quad (5)$$

where $FFNN_a$ is a feed-forward network of the mention extractor network and $g_i \circ g_j$ is a composite function of $g_i$ and $g_j$. Conventional coreference resolution techniques may compute a span pair vector based on additional features such as genre information of a transcript and a distance between two span embeddings. In contrast, in some embodiments, the mention linker omits the additional factors, including genre information of the transcript and a distance between two span embeddings, from the computation of the span pair vector $s_a(i, j)$, thereby providing a simpler coreference resolution model.

At operation 915, the system applies a mention linker network to the span pair vector to obtain a similarity score for the pair of candidate spans, where the coreference information is based on the similarity score. In some cases, the operations of this step refer to, or may be performed by, a mention linker network as described with reference to FIGS. 2 and 3. For example, the mention linker network computes the similarity score $s_{(i,j)}$:

$$s_{(i,j)}=s_m(i)+s_m(j)+s_a(i,j) \quad (6)$$

where $s_m(j)$ is calculated using equation 4.

In some embodiments, the similarity score $s_{(i,j)}$ is thereby affected by three factors: whether span i corresponds to an entity mention, whether span j corresponds to an entity mention, and whether span j is an antecedent of span i (e.g., whether span i and span j are entity mentions that refer to a same entity). In a case in which the span i is a dummy antecedent, $s_m(i)$ is fixed to 0. In some embodiments, the entity linker network thereby uses the similarity scores $s_{(i,j)}$ to determine that two or more entity mentions refer to a same entity, and to cluster the two or more entity mentions. In cases where an only one entity mention in the transcript refers to a particular entity, the entity linker network thereby clusters the one entity mention based on the dummy antecedent.

In some embodiments, the coreference information indicates that a pair of candidate spans of the set of candidate spans corresponds to a pair of entity mentions that refer to a same entity. For example, in some embodiments, the entity linker network generates coreference information that includes a visual representation that identifies the pair of candidate spans as corresponding to entity mentions that refer to a same entity. In some cases, the visual representation is a text-based list of tokens included in the pair of candidate spans. In some cases, the visual representation includes the text included in the transcript, where text corresponding to the pair of candidate spans is differentiated from remaining text in the transcript (such as by underlying, bolding, italicizing, highlighting, surrounding with a shape, etc.). In some cases, each candidate span in the transcript that corresponds to a same entity is similarly differentiated from other text in the transcript. Accordingly, the entity linker network provides a visual representation of entity mention clusters.

Training

A method for coreference resolution is described with reference to FIGS. 10-12. One or more aspects of the method include identifying training data comprising training text, mention annotation data, and coreference annotation data; encoding a plurality of candidate spans from the training text to obtain a plurality of span vectors; extracting a plurality of entity mentions from the training text based on the plurality of span vectors using a mention extractor network, wherein each of the plurality of entity mentions corresponds to one of the plurality of candidate spans; updating parameters of the mention extractor network in a first training phase based on the plurality of entity mentions and the mention annotation data; extracting an updated plurality of entity mentions from the training text based on the plurality of span vectors using the mention extractor network with the updated parameters; generating coreference information based on the updated plurality of entity mentions using a mention linker network, wherein the coreference information indicates that a pair of candidate spans of the plurality of candidate spans corresponds to a pair of entity mentions that refer to a same entity; and updating the mention linker network in a second training phase based on the coreference information and the coreference annotation data.

Some examples of the method further include inserting a speaker tag in the training text, wherein the speaker tag indicates that a name in the training text corresponds to a speaker of a portion of the training text. Some examples of the method further include updating the parameters of the mention extractor network in the second training phase based on the coreference information and the coreference annotation data.

Some examples of the method further include generating a mention score for each of the plurality of candidate spans based on a corresponding span vector from the plurality of span vectors using the mention extractor network. Some examples further include computing a detection score for each of the plurality of candidate spans based on the mention score and a binary value indicating whether the candidate span is included in the mention annotation data. Some examples further include computing a detection loss based on the detection score, wherein the parameters of the mention extractor network are updated based on the detection loss in the first training phase.

Some examples of the method further include identifying an antecedent for an entity mention of the plurality of entity mentions based on the coreference annotation data. Some examples further include identifying a probability of the antecedent for the entity mention based on the coreference information. Some examples further include computing an objective function based on the probability, wherein the parameters of the mention linker network are updated to optimize the objective function.

Figure 10:
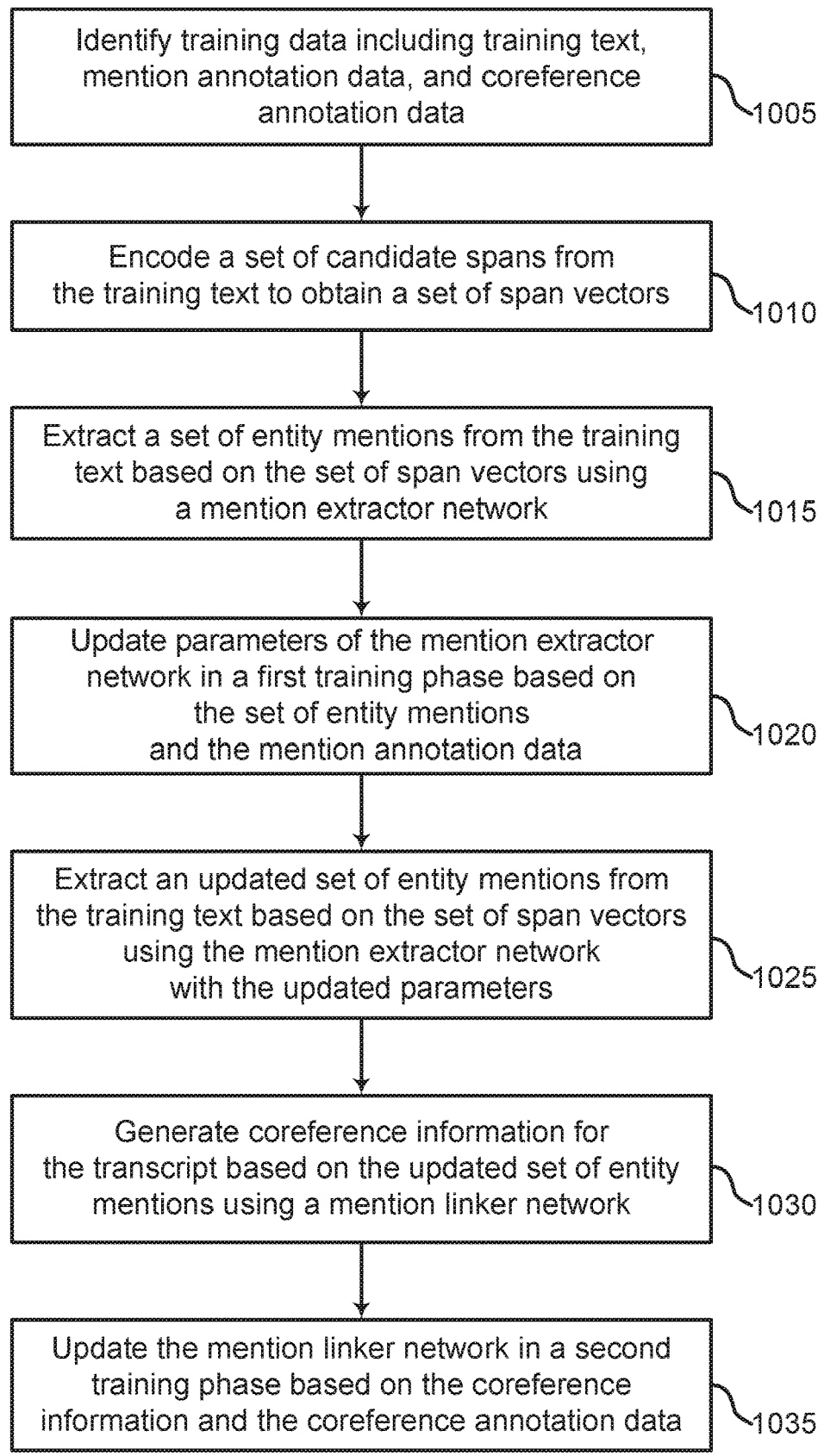
FIG. 10 shows an example of updating a machine learning model according to aspects of the present disclosure.

FIG. 10 shows an example of updating a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 10, a training component described with reference to FIG. 2 updates the machine learning model in two training phases. At operation 1005, the system identifies training data including training text, mention annotation data, and coreference annotation data. In some cases, the operations of this step refer to, or may be performed by, a training component as described with reference to FIG. 2. In some embodiments, the training text is a tokenized representation of a transcript as described with reference to FIG. 6. In some embodiments, the mention annotation data is one or more annotations included in the training text that indicate whether a span of tokens included in the training text is an entity mention. In some embodiments, the coreference annotation data is one or more annotations included in the training text that indicate whether a pair of spans of the transcript include entity mentions that correspond to a same entity.

In some embodiments, the mention annotation data includes one or more singleton mentions. A singleton mention is an entity mention that does not refer to an entity that any other entity mention in the transcript refers to. In contrast to convention coreference resolution techniques, which may omit singleton mentions from their training data, some embodiments of the present disclosure include singleton mentions in the mention annotation data to more efficiently train the mention extractor network.

At operation 1010, the system encodes a set of candidate spans from the training text to obtain a set of span vectors. In some cases, the operations of this step refer to, or may be performed by, an encoder network as described with reference to FIGS. 2 and 3. In some embodiments, the encoder network receives the training text from the training component and obtains the set of span vectors as described with reference to FIG. 6.

At operation 1015, the system extracts a set of entity mentions from the training text based on the set of span vectors using a mention extractor network, where each of the set of entity mentions corresponds to one of the set of candidate spans. In some cases, the operations of this step refer to, or may be performed by, a mention extractor network as described with reference to FIGS. 2 and 3. In some embodiments, the mention extractor network receives the training text from the encoder and extracts the set of entity mentions from the training text as described with reference to FIGS. 6 and 8.

At operation 1020, the system updates parameters of the mention extractor network in a first training phase based on the set of entity mentions and the mention annotation data. In some cases, the operations of this step refer to, or may be performed by, a training component as described with reference to FIG. 2. In some embodiments, the training component updates the parameters of the mention extractor network in the first training phase as described with reference to FIG. 11.

At operation 1025, the system extracts an updated set of entity mentions from the training text based on the set of span vectors using the mention extractor network with the updated parameters. In some cases, the operations of this step refer to, or may be performed by, a mention extractor network as described with reference to FIGS. 2 and 3. In some embodiments, the mention extractor network with the updated parameters extracts the updated set of entity mentions in a similar manner as described with reference to FIGS. 6 and 8.

At operation 1030, the system generates coreference information based on the updated set of entity mentions using a mention linker network, where the coreference information indicates that a pair of candidate spans of the set of candidate spans corresponds to a pair of entity mentions that refer to a same entity. In some cases, the operations of this step refer to, or may be performed by, a mention linker network as described with reference to FIGS. 2 and 3. In some embodiments, the mention linker generates the coreference information as described with reference to FIGS. 6 and 9.

At operation 1035, the system updates the mention linker network in a second training phase based on the coreference information and the coreference annotation data. In some cases, the operations of this step refer to, or may be performed by, a training component as described with reference to FIG. 2. In some embodiments, the training component updates the mention linker network as described with reference to FIG. 12.

Figure 11:
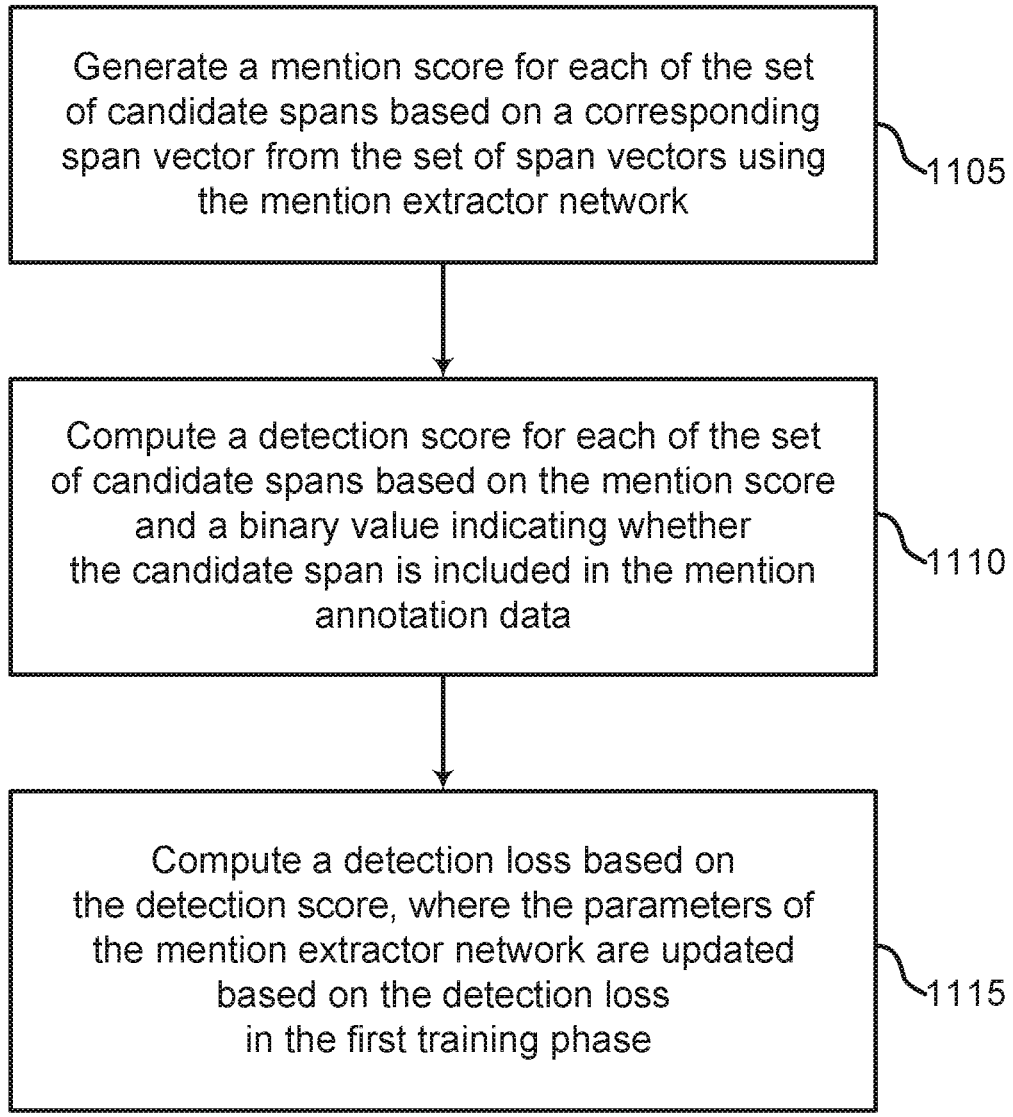
FIG. 11 shows an example of updating a mention extractor network according to aspects of the present disclosure.

FIG. 11 shows an example of updating a mention extractor network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates a mention score for each of the set of candidate spans based on a corresponding span vector from the set of span vectors using the mention extractor network. In some cases, the operations of this step refer to, or may be performed by, a mention extractor network as described with reference to FIGS. 2 and 3. In some embodiments, the mention extractor network generates the mention score as described with reference to FIGS. 6 and 8.

At operation 1110, the system computes a detection score for each of the set of candidate spans based on the mention score and a binary value indicating whether the candidate span is included in the mention annotation data. In some cases, the operations of this step refer to, or may be performed by, a training component as described with reference to FIG. 2. For example, the training component computes the detection score $\mathcal{L}_{detect}(i)$:

$$\mathcal{L}_{detect}(i) = y_i \log \hat{y}_i + (1-y_i)\log(1-\hat{y}_i) \quad (7)$$

where $\hat{y}_i = \text{sigmoid}(s_m(i))$ and $y_i = 1$ if and only if the span i is included in the mention annotation data.

At operation 1115, the system computes a detection loss based on the detection score, where the parameters of the mention extractor network are updated based on the detection loss in the first training phase. In some cases, the operations of this step refer to, or may be performed by, a training component as described with reference to FIG. 2. For example, the training component computes the detection loss $\mathcal{L}_{detect}$:

$$\mathcal{L}_{detect} = -\sum_{i \in S} \mathcal{L}_{detect}(i) \quad (8)$$

where S is a set of candidate spans that correspond to a mention score $s_m(i)$ that equal or exceed the mention score threshold λn described with reference to FIG. 8.

The term "loss" refers to a value computed according to a loss function that impacts how a machine learning model is trained in a supervised learning model. Specifically, during each training iteration, the output of the model is compared to the known annotation information in the training data. The loss function provides a value for how close the predicted annotation data is to the actual annotation data (e.g., the loss). In some embodiments, after computing the detection loss, the training component updates the parameters of the mention extractor network based on the detection loss.

Figure 12:
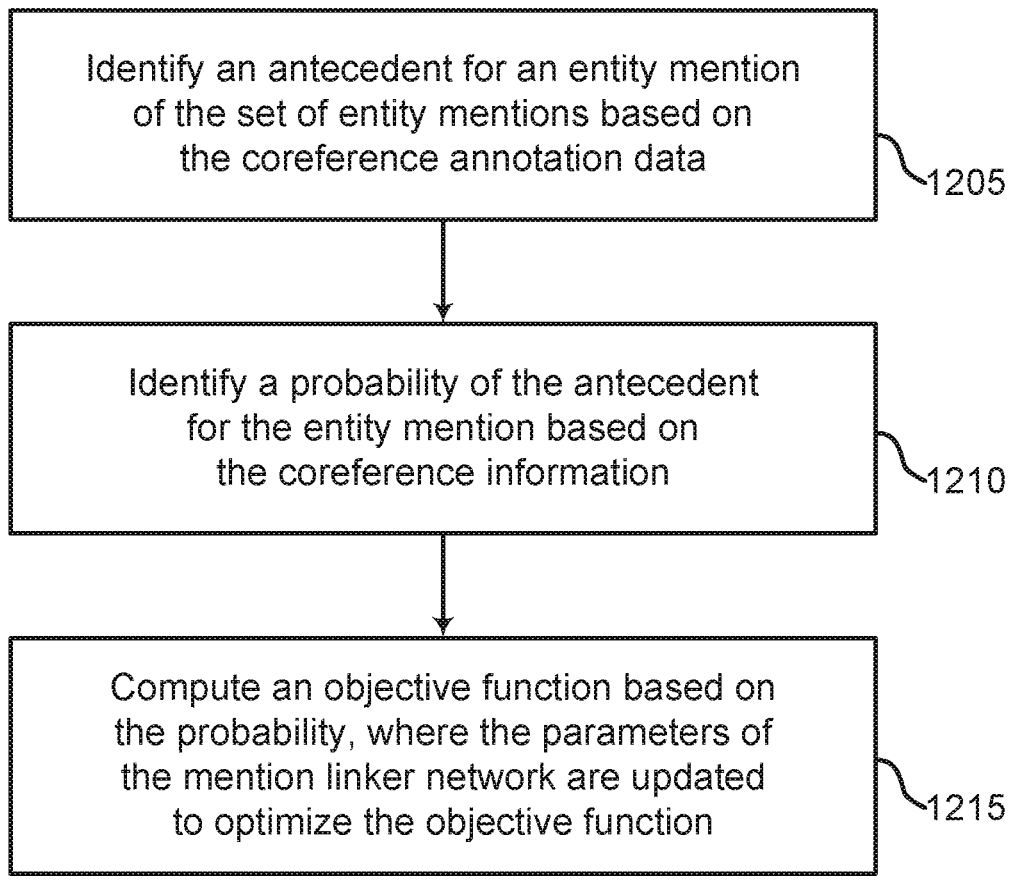
FIG. 12 shows an example of updating a mention linker network according to aspects of the present disclosure.

FIG. 12 shows an example of updating a mention linker network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system identifies an antecedent for an entity mention of the set of entity mentions based on the coreference annotation data. In some cases, the operations of this step refer to, or may be performed by, a mention linker network as described with reference to FIGS. 2 and 3. In some embodiments, the mention linker identifies an antecedent as described with reference to FIGS. 6 and 9.

At operation 1210, the system identifies a probability of the antecedent for the entity mention based on the coreference information. In some cases, the operations of this step refer to, or may be performed by, a mention linker network as described with reference to FIGS. 2 and 3. In some embodiments, the probability $P(\hat{y})$ is a likelihood that the antecedent is an antecedent for the entity mention, and the mention linker network determines the probability $P(\hat{y})$ based on a similarity score corresponding to the coreference information, as described with reference to FIG. 9.

At operation 1215, the system computes an objective function based on the probability, where the parameters of the mention linker network are updated to optimize the objective function. In some cases, the operations of this step refer to, or may be performed by, a training component as described with reference to FIG. 2. In some embodiments, the objective function is a marginal log-likelihood function:

$$\log \prod_{i \in S} \prod_{\hat{y} \in Y(i) \cap GOLD(i)} P(\hat{y}) \quad (9)$$

where S is the set of top-scoring entity mentions extracted by the mention extractor network (as determined by comparison with the mention score threshold λn) and GOLD(i) is a set of entity mentions corresponding to the coreference annotation data. In comparison with conventional coreference resolution techniques, embodiments of the present disclosure may achieve a high recall of entity mentions associated with the coreference annotation data while using a lower mention score threshold λn (for example, 0.25 instead of 0.4), thereby providing a simplified and less computationally expensive method of coreference clustering.

In some embodiments, the training component updates the parameters of the mention extractor network in the second training phase based on the coreference information and the coreference annotation data. In an example, the training component jointly updates the parameters of the mention extractor network with the mention linker network in the second training phase by minimizing the objective function of equation 9.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for coreference resolution, comprising:
obtaining a transcript including a first span of text separated from a second span of text;
determining that the first span of text comprises a name of a speaker of the second span of text;
inserting a speaker tag into the obtained transcript based on the determination, wherein the speaker tag comprises an opening tag inserted before the first span of text of the obtained transcript and a closing tag inserted after the first span of text of the obtained transcript, and wherein the speaker tag indicates that the first span of text comprises the name of the speaker;
encoding a plurality of candidate spans from the transcript using an encoder network of a machine learning model to obtain a plurality of span vectors, wherein the speaker tag is included in at least one candidate span of the plurality of candidate spans;
extracting a plurality of entity mentions from the transcript based on the plurality of span vectors using a mention extractor network of the machine learning model, wherein each of the plurality of entity mentions corresponds to one of the plurality of candidate spans; and
generating coreference information for the transcript based on the plurality of entity mentions using a mention linker network of the machine learning model, wherein the coreference information indicates that a pair of candidate spans of the plurality of candidate spans corresponds to a pair of entity mentions that refer to a same entity.

2. The method of claim 1, further comprising:
identifying a threshold span length; and
selecting each span in the transcript that is less than the threshold span length to obtain the plurality of candidate spans.

3. The method of claim 1, further comprising:
encoding individual tokens of the transcript including the speaker tag to obtain a plurality of encoded tokens; and
identifying a starting token and an end token for each of the plurality of candidate spans, wherein a span vector corresponding to each of the plurality of candidate spans includes the starting token and the end token.

4. The method of claim 3, further comprising:
generating an attention vector based on a subset of the encoded tokens corresponding to each of the plurality of candidate spans, wherein the span vector includes the attention vector.

5. The method of claim 1, further comprising:
generating a mention score for each of the plurality of candidate spans based on a corresponding span vector from the plurality of span vectors;
identifying a mention score threshold; and
determining that each of the plurality of entity mentions has a mention score that exceeds the mention score threshold, wherein the plurality of entity mentions are extracted based on the determination.

6. The method of claim 1, further comprising:
identifying the pair of candidate spans from the plurality of candidate spans;
combining a pair of span vectors of the plurality of span vectors corresponding to the pair of candidate spans to obtain a span pair vector; and
applying a mention linker network to the span pair vector to obtain a similarity score for the pair of candidate spans, wherein the coreference information is based on the similarity score.

7. The method of claim 6, further comprising:
combining the similarity score with mention scores for each of the pair of candidate spans to obtain a coreference score, wherein the coreference information includes the coreference score.

8. The method of claim 6, further comprising:
computing a product of the pair of span vectors, wherein the span pair vector includes the pair of span vectors and the product of the pair of span vectors.

9. A method for coreference resolution, comprising:
obtaining training data comprising training text, mention annotation data, and coreference annotation data, wherein the training text includes a first span of text separated from a second span of text;
determining that the first span of text comprises a name of a speaker of the second span of text;
inserting a speaker tag into the obtained training text based on the determination, wherein the speaker tag comprises an opening tag inserted before the first span of text of the obtained training text and a closing text inserted after the first span of text of the obtained training text, and wherein the speaker tag indicates that the first span of text comprises the name of the speaker;
encoding a plurality of candidate spans from the training text using an encoder network of a machine learning model to obtain a plurality of span vectors, wherein the speaker tag is included in at least one candidate span of the plurality of candidate spans;
extracting a plurality of entity mentions from the training text based on the plurality of span vectors using a mention extractor network of the machine learning model, wherein each of the plurality of entity mentions corresponds to one of the plurality of candidate spans;
updating parameters of the mention extractor network in a first training phase based on the plurality of entity mentions and the mention annotation data;
extracting an updated plurality of entity mentions from the training text based on the plurality of span vectors using the mention extractor network with the updated parameters;
generating coreference information based on the updated plurality of entity mentions using a mention linker network of the machine learning model, wherein the coreference information indicates that a pair of candidate spans of the plurality of candidate spans corresponds to a pair of entity mentions that refer to a same entity; and
updating the mention linker network in a second training phase based on the coreference information and the coreference annotation data.

10. The method of claim 9, further comprising:
updating the parameters of the mention extractor network in the second training phase based on the coreference information and the coreference annotation data.

11. The method of claim 9, further comprising:
generating a mention score for each of the plurality of candidate spans based on a corresponding span vector from the plurality of span vectors using the mention extractor network;
computing a detection score for each of the plurality of candidate spans based on the mention score and a binary value indicating whether the candidate span is included in the mention annotation data; and
computing a detection loss based on the detection score, wherein the parameters of the mention extractor network are updated based on the detection loss in the first training phase.

12. The method of claim 9, further comprising:
identifying an antecedent for an entity mention of the plurality of entity mentions based on the coreference annotation data;
identifying a probability of the antecedent for the entity mention based on the coreference information; and
computing an objective function based on the probability, wherein the parameters of the mention linker network are updated to optimize the objective function.

13. A system comprising:
a memory component; and
a processing device coupled to the memory component, the processing device configured to perform operations comprising:
obtaining a transcript including a first span of text separated from a second span of text;
determining that the first span of text comprises a name of a speaker of the second span of text;
inserting a speaker tag into the obtained transcript based on the determination, wherein the speaker tag comprises an opening tag inserted before the first span of text of the obtained transcript and a closing tag inserted after the first span of text of the obtained transcript, and wherein the speaker tag indicates that the first span of text comprises the name of the speaker;
encoding a plurality of candidate spans from the transcript using an encoder network of a machine learning model to obtain a plurality of span vectors, wherein the speaker tag is included in at least one candidate span of the plurality of candidate spans;
extracting a plurality of entity mentions from the transcript based on the plurality of span vectors using a mention extractor network of the machine learning model, wherein the mention extractor network is trained based on mention annotation data in a first training phase and based on coreference annotation data in a second training phase; and
generating coreference information for the transcript based on the plurality of entity mentions using a mention linker network of the machine learning model, wherein the coreference information indicates that a pair of candidate spans of the plurality of candidate spans corresponds to a pair of entity mentions that refer to a same entity, and wherein the mention linker network is trained jointly with the mention extractor network on the coreference annotation data in the second training phase.

14. The system of claim 13, wherein:
the encoder network comprises a transformer network.

15. The system of claim 13, wherein:
the mention extractor network comprises a feed-forward neural network.

16. The system of claim 13, wherein:
the mention linker network comprises a feed-forward neural network.

17. The system of claim 13, further comprising:
a training component configured to update parameters of the mention extractor network and the mention linker network.

* * * * *